United States Patent [19]
Rapp

[11] Patent Number: 5,081,076
[45] Date of Patent: Jan. 14, 1992

[54] LOW LIQUIDUS, STABLE HEAVY METAL FLUORIDE GLASS COMPOSITIONS

[75] Inventor: Charles F. Rapp, Newark, Ohio

[73] Assignee: Owens-Corning Fiberglas Corporation, Toledo, Ohio

[21] Appl. No.: 604,294

[22] Filed: Oct. 29, 1990

[51] Int. Cl.$^5$ .......................... C03C 3/32; C03C 4/08; C03C 4/10
[52] U.S. Cl. ........................ 501/40; 501/37; 501/904
[58] Field of Search ............... 501/40, 37, 904

[56] References Cited

U.S. PATENT DOCUMENTS

| | | | |
|---|---|---|---|
| 4,141,741 | 2/1979 | Lucas et al. | 106/47 |
| 4,328,318 | 5/1982 | Miranday et al. | 501/40 |
| 4,405,724 | 9/1983 | Tick | 501/44 |
| 4,661,413 | 4/1987 | Maze et al. | 501/40 |
| 4,717,691 | 1/1988 | Lucas et al. | 501/40 |
| 4,761,387 | 8/1988 | Tokida et al. | 501/40 |
| 4,946,490 | 8/1990 | Hall et al. | 501/40 |

FOREIGN PATENT DOCUMENTS

56-9245  1/1981  Japan .................. 501/40

OTHER PUBLICATIONS

Chemistry of Fluoride Glasses, M. Poulain & G. Maze, Chemtronics, vol. 3, 1988, pp. 77–85.
Scattering Characteristics in Reheated Fluorozirconate Glasses, H. Tokiwa, Y. Mimura, O. Shinbori & T. Nakai, Journal of Lightwave Technology, vol. LT-3, No. 3, Jun. 1985, Column 2, pp. 574–578.
A Core-Clad Composition for Crystallization-Free Fluoride Fibers, H. Tokiwa, Y. Mimura, O. Shinbori & T. Nakai, Journal of Lightwave Technology, vol. LT-3, No. 3, Jun., 1985, pp. 569–573.
Electronic Letters, vol. 21, No. 24, pp. 1131 & 1132, Nov. 21, 1985, H. Tokiwa, Y. Mimura, T. Nakai, O. Shinbori, Fabrication of Long Single Mode & Multimode Fluoride Glass Fibers by the Double Crucible Technique.
Fluoride Glasses, Alan E. Comyns, p. 194, Society of Chemical Industry by John Wiley & Sons, 1989, Japan, J. Appl. Phys. 25 L468(1986), pp. 72, 73, 194.
Treaties on Materials Science & Technology, vol. 26, Glass IV, by Minoru Tomazawa & Robert Doremus, Academic Press Inc., 1985, pp. 156–173, 183, 197, 198.

*Primary Examiner*—Mark L. Bell
*Attorney, Agent, or Firm*—Patrick P. Pacella; Ted C. Gillespie; Robert F. Rywalski

[57] ABSTRACT

Crystallization-resistant, low liquidus, fluoride glasses are disclosed which consist essentially of $ZrF_4$, optionally $HfF_4$, $BaF_2$, at least one of CsF or NaF, preferably $AlF_3$ and $LaF_3$, and at least one of $InF_3$, $YF_3$ and $GaF_3$. The glasses are of utility as optical components because of their high IR transmission.

26 Claims, No Drawings

LOW LIQUIDUS, STABLE HEAVY METAL FLUORIDE GLASS COMPOSITIONS

GOVERNMENT CONTRACT

This invention was made with Government support under Government Contract No. N00014-89-C-2459 and Government Contract No. N00014-89-C-2130 awarded by the Department of Defense. The Government has certain rights in this invention.

TECHNICAL FIELD

The present invention relates to glass compositions and more particularly the invention relates to glass compositions which are suitable for use as optical components. Even yet more particularly the present invention relates to heavy metal fluoride glasses.

BACKGROUND OF THE ART

There has been a need in the art for glass compositions having unique properties making them applicable for uses in various optical applications. Some of these optical applications include the use of such glasses as laser windows, as multi-spectral lenses and as various optical components. In the laser application area where the glasses are used as windows there is a need for these glasses to have good infra-red transmission at 3.39 micrometers in the case of a helium-neon laser, good transmission at 3.8 micrometers for a dueterium fluoride laser and good transmission at 2.7 micrometers for a hydrogen fluoride laser. In these optical applications there is also a need to provide for a glass which will have a negative change in refractive index with increase in temperature to compensate for the coefficient of thermal expansion.

In order to satisfy these needs, glasses in the zirconium tetrafluoride-barium difluoride-sodium fluoride system were employed. These $ZrF_4$ - $BaF_2$ - NaF glasses possessed a problem of poor stability, i.e. their tendency towards devitrification was high. In order to solve this problem aluminum trifluoride and lanthanum trifluoride were added to the compositions. While this improved the resistance to devitrification, that is made the glasses more stable, unfortunately, this modification produced glasses with a high liquidus temperature. One such glass which has received a substantial amount of publicity and use is a 53 $ZrF_4$ - 20 $BaF_2$ - 20 NaF - 3 $AlF_3$ - 4 $LaF_3$ system (all in mole percent). This glass, although exhibiting a stability (which will be subsequently defined) of about 100 has a liquidus temperature of about 600° C. Those skilled in the art recognize that such a high liquidus temperature for these low viscosity glasses creates problems in forming high quality glass articles. This is especially true when the articles are to be cast, for example, for use as windows with lasers. Such a high liquidus temperature creates practical problems in casting, such as problems with regard to glass flow, bubble entrapment, localized mold overheating, variations in refractive index because the flow tends to be turbulent rather than laminar and crystallization problems. Obviously these problems result in the formation of a poor quality glass.

The present invention solves these problems and satisfies the need in the art by providing for novel fluoride glasses which have low liquidus temperatures and good stability, that is, good resistance against crystallization. The glasses also have good infra-red transmittance characteristics, making them quite desirable for various optical applications, including laser windows and lenses.

DISCLOSURE OF THE INVENTION

In accordance with the present invention novel, crystallization resistant, low liquidus, fluoride glass compositions are provided which consist essentially of in mole percent (i) $ZrF_4$, or a mixture of $ZrF_4$ and $HfF_4$ in an amount of about 50 to about 56 percent, the mole ratio of $ZrF_4$ to $HfF_4$ (when present) being at least about 1:2, (ii) $BaF_2$ about 15 to about 25, (iii) CsF or NaF or a mixture thereof in a total amount of about 15-25%, (iv) $AlF_3$ in an amount up to 2%, (v) $LaF_3$ in an amount up to 3%, (vi) $InF_3$, $YF_3$ or $GaF_3$ or mixtures thereof, wherein the total amount of $AlF_3 + LaF_3 + InF_3 + YF_3 + GaF_3$ is about 6% to about 10%. These glasses have liquidus temperatures well below 600° C., for example, below 550° C. and many of the glasses below 520° C. some being as low as 400° or 450° C.

Aluminum fluoride when present in an amount of about 1.5 to about 2% and lanthanum fluoride when present in an amount of about 2.5 to about 3% produce excellent glasses.

If yttrium trifluoride is present most desirable glasses will be formed when $YF_3 + LaF_3$ is about 4% or less. Similarly, when indium trifluoride is present most desirable glasses will be formed when $InF_3$ is present in an amount of no more than about 2%. Especially desirable glasses will be formed in a system of $ZrF_4$ (and optionally $HfF_4$) - $BaF_2$ - NaF - $AlF_3$ - $LaF_3$ - $GaF_3$. Suitably the $GaF_3$ content is about 1% to about 4%, most preferably about 2% to about 4%.

Generally in glasses of the type described above it is preferred that the amount of $AlF_3 + LaF_3 + InF_3 + YF_3 + GaF_3$ be about 6 to about 9%. Suitable compositions typically include 4 to about 5% total of $AlF_3 + LaF_3$. Outstanding glass compositions will be produced in which the amount of $BaF_2$ is preferably in the range of about 17%–23% and typically about 17 to about 20%.

Highly desirable, stable, low liquidus temperature fluoride glasses will consist essentially of the following in mole percent, (i) $ZrF_4$ or a mixture of $ZrF_4$ and $HF_4$ in a total amount of about 50 to about 56%, the amount of $HfF_4$, when present, being up to about 37% (based on total glass), (ii) $BaF_2$ about 15 to about 25%, (iii) CsF or NaF or a mixture thereof in a total amount of about 15-25%, (iv) $AlF_3$ in an amount up to 2%, (v) $LaF_3$ in an amount up to 3%, (vi) $GaF_3$ wherein the total amount of $AlF_3 + LaF_3 + GaF_3$ is about 6% to about 10%.

DETAILED DESCRIPTION OF THE INVENTION INCLUDING THE BEST MODE FOR CARRYING THE INVENTION OUT

Reference has been made above to the glass stability, that is the resistance of the glass to devitrification. For purposes of the present application, the stability criteria referred to above and in the Examples and claims is based on differential scanning calorimetry measurements and a modified Hruby stability criterion. The use of differential scanning calorimetry and Hruby criterion to approximate glass stability is known and is generally exemplified in CHEMTROMICS, 1988, Volume 3 (June) at page 83. In the present application the stability is determined as $T_x - T_g$ where $T_x$ is the temperature at which crystallization begins (a non-equilibrium state) and $T_g$ is the glass transition temperature. These values are obtained in a known manner from a DSC curve.

Table I below sets forth some representative outstanding glass compositions contemplated by the present invention. All percentages are in mole percents. Glass G in addition to being an outstanding glass for casting glass parts or articles for use such as windows, lenses and other optical components, is also especially well adapted, because of its high stability, for use in clad-core fiber structures for low loss optical fiber applications, especially optical waveguides.

TABLE I

|  | A (Prior Art) | B | C | D | E | F | G | H | I | J |
|---|---|---|---|---|---|---|---|---|---|---|
| $ZrF_4$ | 53 | 53 | 53 | 53 | 56 | 53 | 51 | 53 | 51 | 50 |
| $BaF_2$ | 20 | 20 | 20 | 20 | 17 | 20 | 20 | 20 | 20 | 18.18 |
| $NaF$ | 20 | 20 | 20 | 20 | 20 | 18 | 20 | 10 | 10 | 18.18 |
| $AlF_3$ | 3 | 2 | 2 | 1.5 | 1.5 | 2 | 2 | 2 | 2 | 1.81 |
| $LaF_3$ | 4 | 3 | 3 | 2.5 | 2.5 | 3 | 3 | 3 | 3 | — |
| $InF_3$ | — | 1 | — | — | — | — | — | — | — | — |
| $YF_3$ | — | 1 | — | — | — | — | — | — | — | — |
| $GaF_3$ | — | — | 2 | 3 | 3 | 4 | 4 | 2 | 4 | 7.27 |
| $HfF_4$ | — | — | — | — | — | — | — | — | — | — |
| $CsF$ | — | — | — | — | — | — | — | 10 | 10 | 4.55 |
| Liquidus Temperature (°C.) | 600 | 500 | 450 | 440 | 520 | 500 | 450 | >440 | — | >495 |
| Stability (°C.) | 104 | 100 | 102 | 95 | 91 | 98 | 121 | 107 | — | 88 |
| Tg(°C.) | 257 | 260 | 255 | 259 | 254 | 263 | 256 | 257 | — | 250 |
| Tx(°C.) | 361 | 360 | 357 | 354 | 345 | 361 | 377 | 364 | — | 338 |

The method for producing the fluoride glasses of the present invention is not unlike that of other fluoride glasses. As a general matter, low oxygen containing material should be employed as raw materials. The fluoride glass compositions may be produced employing either a vitreous carbon crucible or employing precious metal crucibles such as, for example, a platinum crucible or a crucible made of platinum and gold alloys. Typically, melting is effected at a temperature of between about 800° C. to about 900° C., more commonly 800° C. to about 850° C. for a sufficient time to provide a molten clear mass, typically one to about two or three hours. After melting, the glasses are annealed. Annealing is done at a temperature of about 260° to 265° C. for about ½ to about two or three hours and then slowly cooled to room temperature. Melting is generally effected at substantially atmospheric pressure although, as will be seen below, a dry environment is employed which is either oxidizing or fluorinating.

When employing a vitreous carbon crucible it is generally preferred to practice the method with an atmosphere of $SF_6$ or $CCl_4$ with the former being preferred. The raw materials when employing a vitreous carbon crucible generally are sublimed $ZrF_4$, $AlF_3$, $GaF_3$, $LaF_3$, $InF_3$, and, when employed, $HfF_4$. Sublimation is a known technique for purifying metal fluorides for use in forming fluoride glasses. See, for example, FLUORIDE GLASSES, page 72 edited by Alan E. Comyns and published for the Society of the Chemical Industry by John Wiley & Sons, 1989. A suitable sublimation technique for $GaF_3$, for example, is to effect sublimation in an argon atmosphere at substantially atmospheric pressure from a lower heated vitreous carbon crucible with condensation being effected on a cooled vitreous carbon crucible which is positioned adjacently upwardly of the heated crucible from which evaporation is being effected. The fluorides of sodium, barium, cesium, lanthanum are preferably crushed powders formed from single crystal materials. Yttrium is employed in the form of anhydrous yttrium fluoride. Suppliers of fluoride compounds are BDH Limited of Poole, England, Cerac, Inc., Johnson Matthey, Harshaw Chemical, Morita, Baker Scientific and E. M. Science. The preferred technique when melting with a vitreous carbon crucible is to use an induction heated furnace in an atmosphere containing $SF_6$. Melting is preferably effected at about 800° C. to about 850° C., as measured by optical pyrometry for about two and one-half to about three hours. After melting the materials are annealed and then slowly cooled to room temperature. It is preferred to pass an admixture of $SF_6$ and argon in a volume ratio of about 100:860 through the furnace during melting.

When melting in a platinum crucible or using crucibles of platinum and gold alloys, it is generally preferred to maintain a flowing stream of argon and oxygen, with oxygen being about 20% by volume, in the furnace. Alternatively dry air or pure oxygen can be employed. The raw materials preferred when employing a platinum crucible are sublimed zirconium fluoride, aluminum fluoride and gallium fluoride. Barium fluoride and sodium fluoride are the reagent grade materials available from either Baker Chemical or E. M. Science. Yttrium fluoride and lanthanum fluoride in powder form from Cerac are preferred. Indium fluoride and hafnium fluoride, when employed, are sublimed materials available from, for example, BDH Limited. Cesium fluoride can be employed as a pulverized single crystal material.

In either instance whether the melting in a platinum crucible or in a vitreous carbon crucible, the melting will be effected in a dry atmosphere. Preferably the atmosphere is less than 10 PPM water and most desirably less than about 1 PPM water. When melting in a vitreous carbon crucible it is preferred that a dry fluorinating atmosphere be present whereas when employing melting with a platinum crucible is preferred that a dry oxidizing atmosphere be present.

During the melting operation it will be observed that there is approximately a one percent by weight total loss. In formulating the batches this weight loss has been compensated for by additional $ZrF_4$.

While the above describes the present invention with sufficient particularity to enable those skilled in the art to make and use same, nonetheless several representative examples follow. In the examples a vitreous carbon crucible was employed and melting was effected using induction heating. The vitreous carbon crucible contained a lid and the crucible was provided with slots to allow the circulation of a mixture of $SF_6$ and Ar in the volume ratio of 100:860 through the crucible during melting.

EXAMPLE 1

In order to produce a glass of the target composition set forth in Table I as (G) 52.12 grams of $ZrF_4$ (sublimed Cerac Z-1037), 21.09 grams of barium fluoride (BDH Product 581515) 5.05 grams of NaF (ground Harshaw single crystal) 1.0 grams of $AlF_3$ (Morita) 3.54 grams of lanthanum fluoride (BDH Product 58154) and 3.05 grams of $GaF_3$ (Cerac G1028) were employed. This batch actually contains approximately 0.85 grams of additional $ZrF_4$ in order to account for the approximate 1% by weight loss during melting. The materials were mixed in a plastic bottle and then melted at a temperature between about 800° to about 850° C. for about two hours and forty minutes using a flowing stream of the argon-sulfur hexafluoride mixture noted above. Prior to melting the furnace was purged of air by the use of the same argon/$SF_6$ mixture.

The glass was then annealed at a temperature of about 263° C. for about one-half hour and the glass then cooled to room temperature. During the cooling, the glass was cooled between about 258° C. to about 243° C. over about a one hour and twenty minute period. During the annealing a flow of argon was employed.

The resulting glass was very clear and had a liquidus temperature of 450° C. and remarkably high stability of 121. $T_x$ was 377° C. and $T_g$ was 256° C.

EXAMPLE 2

Using substantially the same procedure as Example 1, a glass of the target composition set forth as (C) in Table I was produced. The charge included 53.83 grams of zirconium fluoride (sublimed Cerac Z-1037), 20.96 grams of barium fluoride (crushed Harshaw single crystal), 5.02 grams of NaF (crushed Harshaw single crystal), 1.00 grams of $AlF_3$ (Morita Lot 021721), 3.5 grams of lanthanum fluoride (BDH Product 58154) and 1.51 grams of gallium fluoride (Cerac G-1027) which had been purified by sublimation as described above. The resulting glass was very clear and had a liquidus of 450° C. and a stability of 102. $T_x$ was 357° C. and $T_g$ was 255° C. In this Example the weight of zirconium fluoride, as in the case of Example 1, was approximately 1% excess in order to compensate for the weight loss during melting.

EXAMPLE 3

The procedure in Example 1 was substantially followed to produce a glass of the target composition set forth in Table I as (J). As in the other instances, approximately 1% by weight of the batch was added as excess $ZrF_4$ in order to compensate for the weight loss during melting. The batch charge included 51.33 grams of zirconium tetrafluoride (sublimed Cerac Z-1037), 0.92 grams of $AlF_3$ (Morita), 5.56 grams of $GaF_3$ (Cerac G-1028) 19.25 grams of $BaF_2$ (crushed Harshaw single crystal), 4.61 grams of sodium fluoride (crushed Harshaw single crystal) and 4.17 grams of CsF fluoride, (crushed Harshaw single crystal).

The resulting glass was very clear and had a liquidus temperature of in excess of 495° C. with a stability of about 88. $T_x$ was 338° C. $T_g$ was 250° C.

EXAMPLE 4

The procedure of Example 1 was employed to produce the target glass composition set forth as (F) in Table I. The actual batch charge included 53.21 grams of $ZrF_4$ (sublimed Cerac Z-1037), 20.71 grams of $BaF_2$ (BDH Product 58155), 4.46 grams of NaF (crushed Harshaw single crystal material), 0.99 grams of $AlF_3$ (Morita), 3.47 grams of $LaF_3$ (BDH Product 58155) and 2.99 grams of $GaF_3$ (Cerac G-1028).

The glass had a liquidus temperature of about 450° C. and a stability of about 98. $T_x$ was 361° C. $T_g$ was 263° C.

EXAMPLE 5

The procedure of Example 1 was generally followed to produce the prior art glass set forth in Table I as (A). The actual batch charge was about 53.74 grams of $ZrF_4$ (sublimed Cerac Z-1037), 20.93 grams of $BaF_2$ (Harshaw single crystal), 5.02 grams of NaF (Harshaw single crystal), 4.68 grams of $LaF_3$ (BDH Product 58154) and 1.51 grams of $AlF_3$ (Morita). The melting cycle was about two hours rather than two hours and forty minutes used in Example 1. Additionally the annealing at 263° C. was about one hour and 10 minutes. Cooling between about 258° C. to about 243° C. was about one hour and five minutes. Additionally, during the annealing instead of employing the flow of argon, a flow of argon with twenty percent (by volume) of oxygen was employed. The resulting glass was clear and had a liquidus temperature of about 600° C. and a stability of about 104. $T_x$ was 361° C. and $T_g$ was 257° C.

Industrial Exploitation

The foregoing demonstrates the outstanding glasses which are produced in accordance with the present invention. The glasses may be cast and employed as windows for lasers or as lenses and are generally of use for optical components. They have excellent wide band IR transmission.

It will, of course, be apparent that modifications of the present invention are possible which pursuant to the patent statutes and laws do not depart from the spirit and scope of this invention.

I claim:

1. A crystallization resistant, fluoride glass composition consisting essentially of, in mole percent,
   (i) $ZrF_4$, or a mixture of $ZrF_4$ and $HfF_4$ in an amount of about 50 to about 56 percent, the mole ratio of $ZrF_4$ to $HfF_4$ (when present) being at least about 1:2,
   (ii) $BaF_2$ about 15 to about 25,
   (iii) CsF or NaF or a mixture thereof in a total amount of about 15-25%,
   (iv) $AlF_3$ in an amount up to 2%,
   (v) $LaF_3$ in an amount up to 3%,
   (vi) $InF_3$, or $YF_3$ or $GaF_3$ or mixtures thereof, wherein the total amount of $AlF_3+LaF_3+InF_3+YF_3+GaF_3$ is about 6% to about 10% and wherein said glass has a liquidus temperature below about 550° C.

2. The fluoride glass composition of claim 1 wherein when $YF_3$ is present then $YF_3+LaF_3$ is about 4% or less.

3. The fluoride glass composition of claim 1 wherein when $InF_3$ is present it is present in an amount of no more than about 2%.

4. The fluoride glass composition of claim 1 wherein said composition is substantially free of $InF_3$ and $YF_3$ and wherein said constituent (vi) is $GaF_3$.

5. The glass of claim 1 wherein said glass has a liquidus temperature of less than about 520° C. and a stability of at least about 98.

6. The glass of claim 1 wherein $AlF_3+LaF_3+YF_3+InF_3+GaF_3$ is about 6% to about 9%.

7. The glass of claim 6 wherein $AlF_3+LaF_3$ is about 4% to about 5%.

8. The glass of claim 1 wherein $AlF_3$ is present in an amount of about 1.5 to about 2 and $LaF_3$ in an amount of about 2.5 to about 3.

9. The glass of claim 1 wherein said glass has a stability of at least about 100.

10. The glass of claim 1 wherein said glass has a liquidus temperature of less than about 450° C.

11. The glass of claim 4 wherein said glass has a stability in excess of about 120 and a liquidus temperature of about 500° C. or less.

12. The glass of claim 1 wherein said liquidus temperature is about 500° C. or less.

13. The composition of claim 2 wherein $YF_3$ is present in said glass.

14. The composition of claim 1 wherein $InF_3$ is present in said glass.

15. A crystallization resistant, fluoride glass having a low liquidus temperature said glass consisting essentially of in mole percent,
 (i) $ZrF_4$ or a mixture of $ZrF_4$ and $HF_4$ in a total amount of about 50 to about 56%, the amount of $HfF_4$, being up to about 37%,
 (ii) $BaF_2$ about 15% to about 25%,
 (iii) CsF or NaF or a mixture thereof in a total amount of about 15–25%,
 (iv) $AlF_3$ in an amount up to 2%,
 (v) $LaF_3$ in an amount up to 3%,
 (vi) $GaF_3$ wherein the total amount of $AlF_3+LaF_3+GaF_3$ is about 6% to about 10%.

16. The glass of claim 15 wherein $AlF_3+LaF_3$ is between about 4% to about 5%.

17. The glass of claim 16 wherein said $GaF_3$ is present in an amount of about 1% to about 4%.

18. The glass of claim 15 wherein said $GaF_3$ is present in an amount of about 2 to about 4%.

19. The fluoride glass of claim 18 wherein said NaF and CsF are present in an amount of about 18% to about 20%.

20. The glass of claim 15 wherein $BaF_2$ is present in a amount of about 17% to about 23%.

21. The composition of claim 15 wherein said composition consists essentially of about 53% $ZrF_4$, about 20% $BaF_2$, about 20% NaF, about 2% $AlF_3$, about 3% $LaF_3$, about 2% $GaF_3$.

22. The composition of claim 15 wherein said composition consists essentially of about 53% $ZrF_4$, about 20% $BaF_2$, about 20% NaF, about 1.5% $AlF_3$, about 2.5% $LaF_3$, about 3% $GaF_3$.

23. The composition of claim 15 wherein said composition consists essentially of about 51% $ZrF_4$, about 20% NaF, about 20% $BaF_2$, about 2% $AlF_3$, about 3% $LaF_3$, about 4% $GaF_3$.

24. The composition of claim 15 wherein said composition consists essentially of about 53% $ZrF_4$, about 20% $BaF_2$, about 18% NaF, about 2% $AlF_3$, about 3% $LaF_3$, about 4% $GaF_3$.

25. A crystallization resistant, fluoride glass composition consisting essentially of, in mole percent,
 (i) $ZrF_4$, or a mixture of $ZrF_4$ and $HfF_4$ in an amount of about 50 to about 56 percent, the mole ratio of $ZrF_4$ to $HfF_4$ (when present) being at least about 1:2,
 (ii) $BaF_2$ about 15 to about 25,
 (iii) CsF or NaF or a mixture thereof in a total amount of about 15–25%,
 (iv) $AlF_3$ in an amount up to 2%,
 (v) $LaF_3$ in an amount up to 3%,
 (vi) $GaF_3$ in an amount of about 1% to about 4% and wherein the total amount of $AlF_3+LaF_3+GaF_3$ is about 6% to about 10% and wherein said glass has a liquidus temperature below about 550° C.

26. The glass of claim 25 wherein said constituent (vi) is $GaF_3$, present in an amount of about 2 to about 4%.

* * * * *